United States Patent [19]

Anderson

[11] Patent Number: 5,744,247
[45] Date of Patent: Apr. 28, 1998

[54] PACKAGE HAVING IMPROVED BARRIER PROPERTIES

[75] Inventor: George Anderson, Minneapolis, Minn.

[73] Assignee: The Pillsbury Company, Minneapolis, Minn.

[21] Appl. No.: 568,089

[22] Filed: Dec. 6, 1995

Related U.S. Application Data

[62] Division of Ser. No. 950,903, Sep. 24, 1992, Pat. No. 5,500,303.

[51] Int. Cl.$^6$ ............................................. B32B 27/08
[52] U.S. Cl. ........................ 428/475.5; 426/124; 426/126; 426/127; 428/480; 428/500; 428/515; 428/516; 428/913
[58] Field of Search .......................... 428/475.5, 480, 428/500, 515, 516, 913; 426/124, 126, 127

[56] References Cited

U.S. PATENT DOCUMENTS 4,105,818  8/1978  Scholle .
4,874,618  10/1989  Seaborne et al. ........................ 426/76

OTHER PUBLICATIONS

Gyeszly, et al., "Two Packages Are Better Than One," Sep. 1978, *Modern Packaging*, pp. 37–39.
Takashi Kadoya, *Food Packaging* (1988), Chapters 1–4 (pp. 1–67), 7 (pp. 115–135) and 19 (371–395).
A.L. Brody, *Controlled/Modified Atmosphere/Vacuum Packaging of Foods* (1989), pp. 1–179.
A. Hirsch, "Flexible Food Packaging", Van Nostrand Reinhold (1991) Chapters 2 (pp. 5–19), 6(pp. 28–37) and 33 (pp. 203–212).
Ph.D. Dissertation of J.J. Kester (1988), pp. 129 and 152.
Masters Dissertation of I. Greener (1988), pp. 79 and 118.

*Primary Examiner*—E. Rollins Buffalow
*Attorney, Agent, or Firm*—Edward S. Hotchkiss; Aleya Rahman

[57] ABSTRACT

An effective oxygen barrier which can substantially extend the shelf life of oxygen sensitive products comprising at least outer and inner plies of a polymeric material and a substantially anaerobic space between the two or more plies.

5 Claims, 9 Drawing Sheets

PACKAGE HAVING IMPROVED BARRIER PROPERTIES

This application is a division of application Ser. No. 07/950,903, filed Sep. 24, 1992 now U.S. Pat. No. 5,500,303.

FIELD OF THE INVENTION

The present invention generally relates to packages employing gas-permeable films and is particularly useful in packaging oxygen-sensitive products such as food products.

BACKGROUND OF THE INVENTION

Many products are sensitive to gases commonly found in the air, with oxygen tending to be the most problematic of these gases. For instance, many foods tend to be adversely affected by oxygen because they undergo chemical changes in the presence of oxygen that degrade their taste or color. One example of such a chemical change is the tendency of fats to react with oxygen and become rancid. Oxygen may also promote the growth of bacteria and the like which will cause food to spoil.

When commercially packaging oxygen-sensitive food products or the like for extended storage before sale or ultimate use by a consumer, care must be taken to minimize the product's contact with oxygen during storage. When canning food products, the cans are hermetically sealed to keep air from coming into contact with the food. In commercial canning processes, the containers tend to be formed entirely out of metal, with seams being welded or mechanically crimped closed. In home canning processes and in some other commercial processes, glass containers having metal lids are used and the lids commonly include a compressible sealing strip of a rubber-like material to form an air-tight seal between the glass jar and the lid. In some home canning processes, an additional wax barrier is placed between the product and the food to limit contact with any oxygen which may leak through the seal between the jar and the lid.

Both of these types of containers tend to be quite effective in keeping oxygen out of the interior, and hence out of contact with the food stored inside, because metal and glass are essentially absolutely oxygen-impermeable. So long as the seal between the component parts of the containers remains intact, there is little chance that oxygen will enter the container and affect the food.

In modern packaging, plastic materials have in many instances entirely replaced metal or glass as the primary component of the package due to the lower cost of plastics. For instance, frozen pizzas and high-fat products such as potato chips and the like are commonly sold in an entirely plastic container, perhaps using a label formed of paper or some other readily printed material. Unlike metal or glass, though, virtually all polymeric materials used in packaging food are at least slightly permeable to oxygen, with the permeability varying from one plastic material to another. Although plastics tend to be significantly cheaper than metal or glass in most food packaging applications, the oxygen permeability of plastic films can also reduce the effective shelf life of the product contained in the package.

Many attempts have been made to develop materials for use in the packaging industry that minimize oxygen transmission; these attempts have encompassed both development of homogenous polymeric films with new plastics and composite films that may include layers of different plastics. Among the polymeric films most commonly used in the packaging industry are polyvinylidene chloride (PVDC, sold under the trade name "Saran"), which has a relatively low gas permeability or transmittance; biaxially oriented nylon, which exhibits moderate oxygen transmittance; and polyethylene, which transmits oxygen more freely. For instance, a 13 micron film of a PVDC will transmit about 4.0 $cm^3$ of oxygen/$m^2$ of surface area/atmosphere/day, while a 1 mil (25 micron) film of nylon 6 will transmit oxygen at about ten times that rate (about 40 $cm^3$ of oxygen/$m^2$ of surface area/atmosphere/day).

Current composite materials may include a layer of a metal foil, e.g. a 25 μm aluminum foil, disposed between a pair of plastic films, which may be formed of different polymers if so desired. One of the advantages of using a plastic/metal composite material is that the metal layer can, if thick enough, make the composite material substantially totally oxygen impermeable. Unfortunately, though, materials which provide better resistance to oxygen transmission also tend to be more expensive. Plastic/metal composite films are generally much more expensive than a film formed solely of the plastic material and are also opaque, preventing a consumer from seeing the contents of the package at the point of sale. There are also significant cost differences between different polymeric film materials. As a general rule of thumb, polymeric films which have lower rates of oxygen transmittance tend to be more expensive than films with higher oxygen transmission rates.

The oxygen transmittance of a polymeric film of a given composition is generally inversely proportional to its thickness—a film which is twice as thick will transmit about half as much oxygen. Polymeric films used as walls of containers also have to meet certain other physical requirements, such as minimum tensile strength, to provide a suitable commercial container. Accordingly, it is frequently more cost-effective to use a thicker film of a cheaper plastic material than a thinner film of a more expensive plastic to achieve the same net oxygen transmittance.

Numerous attempts have been made to provide a more cost effective oxygen barrier. For instance, U.S. Pat. No. 4,105,818, issued to Scholle, sets forth an alleged improvement in packages using polymeric films. According to Scholle's teachings, one can improve the barrier properties of a plastic film by splitting a single thicker ply of plastic into a pair of thinner films, with each of the thinner films having a thickness about half that of the thicker film. Scholle claims that, at steady-state conditions, a single ply of 0.5 mil PVDC transmits about twice as much oxygen as a single ply of 1.0 mil PVDC, (as one would expect), yet a composite film consisting of two plies of 0.5 mil PVDC transmits less than half the oxygen transmitted by the 1.0 mil film.

This is counterintuitive in that one would expect such a film to transmit at about the same rate as the 1.0 mil film since its total thickness is the same. As explained more fully below, though, this simply is not believed to be the case.

At steady-state, the two-ply film will indeed transmit oxygen at substantially the same rate as a single-ply film having the same total thickness. Furthermore, if air is permitted to remain between the two plies of the composite film it has been found that the transmission rate of such a composite film is actually substantially greater than that of the single-ply film of the same thickness, at least initially. Only after some time has passed will such a composite film approach the transmission rate of the single-ply film of the same thickness; such a film cannot reduce the transmission rate below that of a single-ply of the same thickness.

Other attempts have been made to extend the shelf life of oxygen-sensitive films by providing "oxygen absorbing"

materials in the container with the product. Such oxygen absorbing materials operate on the principle that they are more reactive with oxygen than the product and therefore will consume oxygen entering the package before it can react with the food product. For instance, an oxygen absorbing product sold by Mitsubishi Gas Chemical Company under the trademark AGELESS utilizes finely divided iron powders to scavenge oxygen from the atmosphere.

However, there are concerns with placing such a material in direct physical contact with food products. In addition to obvious risks of degradation of taste and color of the foods, there are concerns regarding the possible reactions of these powders with the food products themselves. Accordingly, if such oxygen absorbing products are used in packaging foods, they must generally be physically isolated from the food. This adds further complexity, and hence cost, to these packages.

It would be advantageous to provide a cost-effective polymeric film material for packaging oxygen-sensitive products which does not suffer from the problems associated with prior art materials. In particular, such a film is desirably translucent or substantially transparent to permit consumers to see the food products at the point of sale. It should not introduce potential contaminants into the inner cavity of the container wherein the product is stored. And, perhaps most importantly, it should provide an effective barrier to oxygen transmission to enhance the shelf life of oxygen-sensitive products without unduly increasing the expense of the package.

SUMMARY OF THE INVENTION

The present invention provides an effective oxygen barrier which can substantially extend the shelf life of oxygen-sensitive products without significantly increasing the cost of packages using the film. The barrier of the invention consists of at least inner and outer plies of a polymeric material and a substantially anaerobic space between the two or more plies. In one preferred embodiment, the space between the plies is filled with a substantially anaerobic gas, such as nitrogen. In an alternative embodiment, at least one of the two plies is provided with a textured surface and a vacuum is drawn on the space between the plies. The texture of the ply or plies will serve to physically space one film from the other, providing a substantially anaerobic space between the two plies.

The present invention also encompasses a variety of package designs using a barrier of the invention. In one embodiment, the package includes a plurality of sides and at least a portion of one of these sides is provided with a substantially transparent or translucent barrier in accordance with the invention. Such a package may be used where it is desired to provide a window in an otherwise opaque package to permit consumers to view its contents. In another embodiment, all of the sides of the container except for one is formed of a barrier film of the invention while the remaining side is formed of a material having barrier properties at least equal to those of the barrier of the invention. Such a package may be used, for instance, where it is preferred that the package include an opaque area for carrying a label or other printed material yet permit a consumer to see the product which they are buying.

DETAILED DESCRIPTION OF PREFERRED EMBODIMENTS

Figure 1:
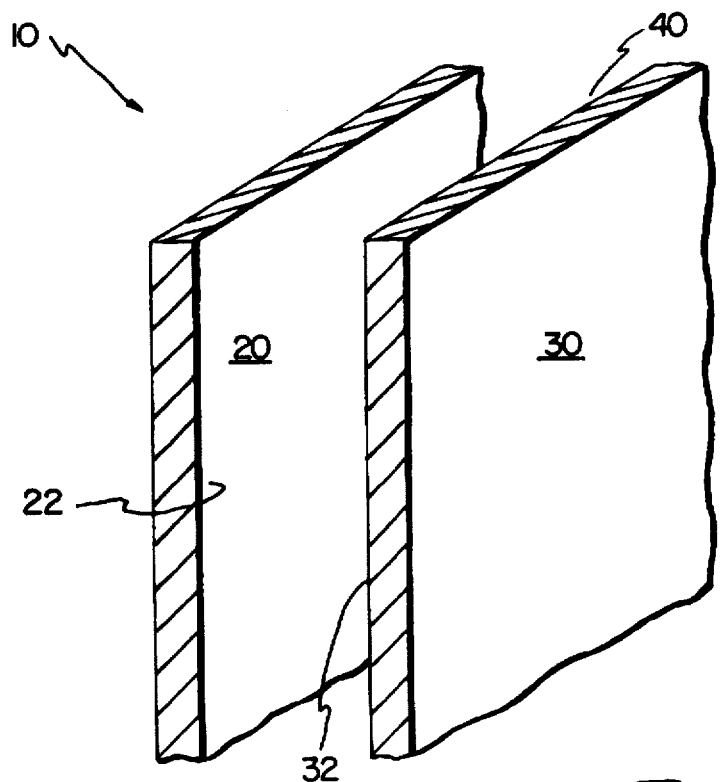
FIG. 1 is a schematic diagram of a composite film barrier in accordance with the invention.

FIG. 1 depicts a composite film barrier according to one preferred embodiment of the invention. In this schematic drawing, the composite film 10 comprises an inner ply of a polymeric material 20, an outer ply of a polymeric material 30, and a substantially anaerobic space 40 disposed therebetween. Each of the two plies is formed of a sheet of polymeric material; these two plies may be formed of the same or different polymers. For reasons explained more fully below, though, it is generally preferred that the two plies be formed of the same polymeric material and have approximately the same thickness so that their individual oxygen transmission rates are approximately equal.

In some applications, the two plies may be formed by simply folding a single sheet of polymeric material to provide two plies adjacent one another and joined together along one edge thereof. In such a design, the inner and outer plies of the barrier may be sealed together, such as by heat sealing or the like, to fully define the anaerobic space therebetween—the space should not be open to the atmosphere.

The plies may be formed of any known polymer having sufficient barrier properties for use in packaging applications. Films currently used in the art include those made from polyester, polypropylene, PVDC, nylon, and polyethylene, as well as multi-layer laminate films formed of contiguous, bonded layers of these and other polymers. Any of these films may be advantageously used in the present invention. One of the goals of the invention, though, is to provide a particularly cost effective oxygen barrier for use in packaging applications. In order to further that end, in many situations it will be advantageous to use a cheaper polymeric film.

The thickness of these two plies of polymeric material may be varied as desired. it is contemplated that the thickness of each of these plies will be dependent on the particular application for which the barrier ten of the invention is being used. This thickness may also depend upon the composition of the plies because, as explained above, the oxygen transmittance of a polymeric film will depend to a very large extent upon the material from which it is formed. It is generally contemplated, though, that the thickness of these films will be at least about 10 µm, and they may be significantly thicker than that, depending on the particular application. For instance, a highly flexible package may be formed of a 10 µm film while a relatively rigid package design may require a much thicker film.

In an alternative embodiment of the invention, at least one of the plies 20,30 of the composite barrier film is formed of an edible polymeric barrier material. Although both of the of the plies may be formed of such an edible barrier, the other of the two plies is desirably formed of an ordinary, inedible polymeric material, as in the embodiment set forth above. It is particularly preferred that the inner ply 20 be the one formed of the edible material and the outer film be formed of the polymeric material. This will permit a consumer to remove the outer, polymeric ply from a package utilizing a barrier of the invention to arrive at an edible food product, eliminating the need to completely remove two separate plies before reaching the product stored within the package.

A variety of edible films are known in the art. A number of different edible films, as well as parameters useful in selecting such films, are set forth by S. Guilbert in "Technology and Application of Edible Protective Films", Chapter 19 (pp. 371–394) of *Food Packaging*, Takashi K., editor (1990), the teachings of which are incorporated herein by reference. In general, edible films are formed from: proteins; cellulose, starches, dextrins or their derivatives; plant hydrocolloids; waxes, fat products, monoglycerides or their derivatives; or mixtures of these materials. For instance, these films may comprise a simple coating of a gelatin material applied directly to the product.

The manner in which an edible film will be formed for use as the inner ply 20 of the invention will vary depending upon the nature of the material used in the film. In many applications, though, a film-forming agent (e.g. gelatin or the like) will be carried in a water-based solution. This solution may be applied directly to the product to be packaged and the solution will be dried to produce the inner ply 20. This coated product may then be sealed within the outer ply 30 with an anaerobic space 40 disposed between the two plies. As explained hereinafter in connection with FIG. 6, it is preferred that the transmittance of the inner ply be about the same as the transmittance of the outer ply. Accordingly, it is desirable that the composition and thickness of each of the two plies be chosen such that the oxygen transmittance of these two plies be about the same.

As explained in some detail below, the anaerobic space 40 between the two plies of the barrier will gradually build a partial pressure of oxygen when stored in air. Nonetheless, it is preferred that the space 40 be generally free of oxygen when the barrier is initially formed. Providing such an anaerobic space may be accomplished in any of a wide variety of manners.

In one preferred embodiment, the space 40 is flushed with a supply of an anaerobic gas. Nitrogen gas is particularly preferred due to its relatively low cost and substantial lack of any toxicity, but virtually any suitable anaerobic gas may be used. Equipment for flushing the headspaces of packages are known in the art and need not be disclosed in detail here. It should also be recognized that it is virtually impossible to completely remove all oxygen from this space. If an anaerobic gas is flushed through the space after the space is already defined, some oxygen will unavoidably remain within the space because no amount of flushing will serve to remove 100% of the oxygen which may be present between the films. The amount of residual oxygen between the two plies 20, 30 may be reduced, though, if the plies are assembled in anaerobic atmospheres, such as by assembling the two plies to form the composite film barrier 10 of the invention within a nitrogen atmosphere. As used herein, the phrase "substantially anaerobic" or "substantially oxygen-free" is intended to take into account these process limitations on economically removing oxygen from the space during commercial packaging of goods.

The anaerobic space 40 may, in another embodiment, be provided by drawing a vacuum on the space 40 rather than filling that space with an anaerobic gas. There are a wide variety of textured polymeric films available on the market. If one or both of the plies 20, 30 of the invention shown in FIG. 1 were made of such a textured film, the texturing of one or both of these plies would tend to define a space between the two films even after a vacuum is drawn on this space. If so desired, only one of the inner surface 22 of the inner film or inner surface 32 of the outer film may be provided with such a texturing. This should still provide a sufficient space between the films if the texturing is appropriately chosen.

The texture which is applied to the inner faces 22, 32 of the plies may be chosen as desired. In most applications where a vacuum is to be drawn, though, it is preferred that the texturing be relatively dense rather than more spread out. By "dense", it is meant that the texture of the surface will vary relatively frequently so that there will not be large surface areas of the film which are smooth and untextured. By way of example, if the texturing of the inner surface of the ply or plies is in a generally grid-shaped pattern, the lines of the grid should be fairly close to one another so that there will not be large, smooth panes between the lines. This will add some structural support to the plies and ensure that the pressure will not collapse one ply fully against the other ply, which could substantially eliminate the anaerobic space 40 between the plies.

In one particular embodiment utilizing the vacuum drawn on the space 40, both plies 20, 30 of the barrier 10 are provided with a series of elongated, substantially linear protrusions on its surface. The linear protrusions of the inner surface 22 of the inner ply and those on the inner surface 32 of the outer ply are desirably oriented generally perpendicularly to one another to essentially produce a grid of abutting protrusions between the films. This will help to maintain an anaerobic space between the two plies 20, 30 when a vacuum is drawn on the anaerobic space 40.

Figure 2:
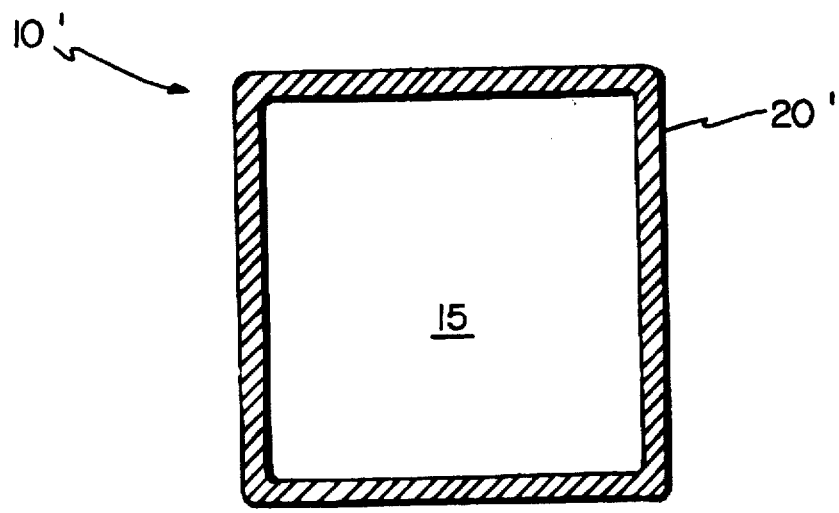
FIG. 2 is a schematic illustration of a prior art package for oxygen-sensitive products.
Figure 3:
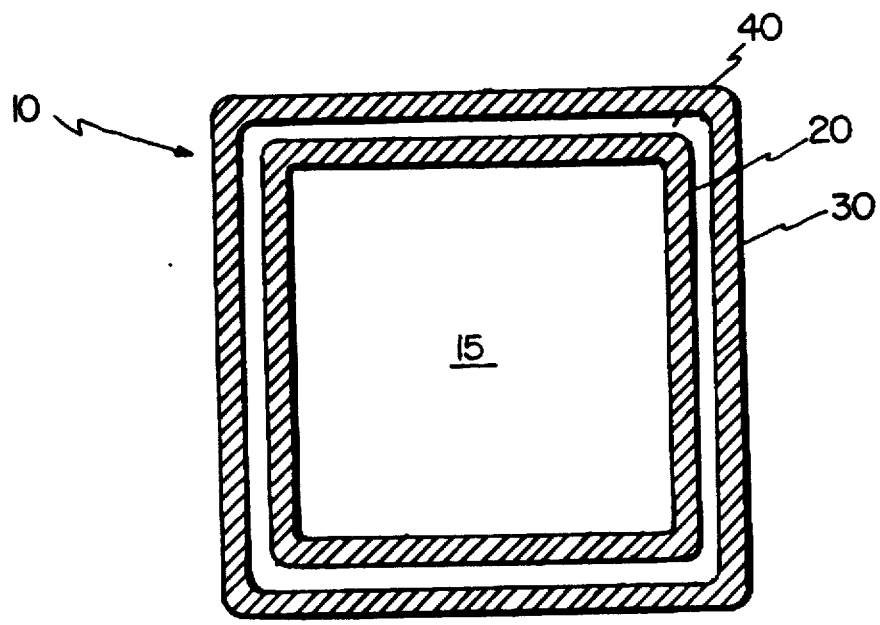
FIG. 3 is a schematic illustration of a package utilizing a composite film barrier of the invention.

The advantages of the present invention over a conventional, single-film package structure are shown in FIGS. 2–7. FIG. 2 is a simplified schematic diagram of a conventional prior art package using a polymeric film. In this conventional package an oxygen-consuming product 15' is contained within a single layer 20' of a polymeric film. FIG. 3 shows a schematic diagram similar to FIG. 2 illustrating a barrier 10 of the present invention using a packaging application. Once again, the oxygen-consuming product 15 is retained within the inner ply 20. In accordance with the present invention, though, a second outer ply 30 is disposed around the inner ply 20 with an anaerobic space 40 being formed between the inner and outer plies.

The oxygen transmission properties of the prior art package illustrated in FIG. 2 are well known in the art. Many products will essentially consume all of the oxygen which may be transmitted through the single barrier 20'. Thus, over time, the differential pressure of oxygen between the external atmosphere (which is assumed to be air with a partial pressure of oxygen of about 0.20 atm) and that within the enclosure defined by the film 20' will remain constant. Under these conditions, one would expect the rate of transmission of oxygen through the film 20' to remain substantially constant.

Figure 7:
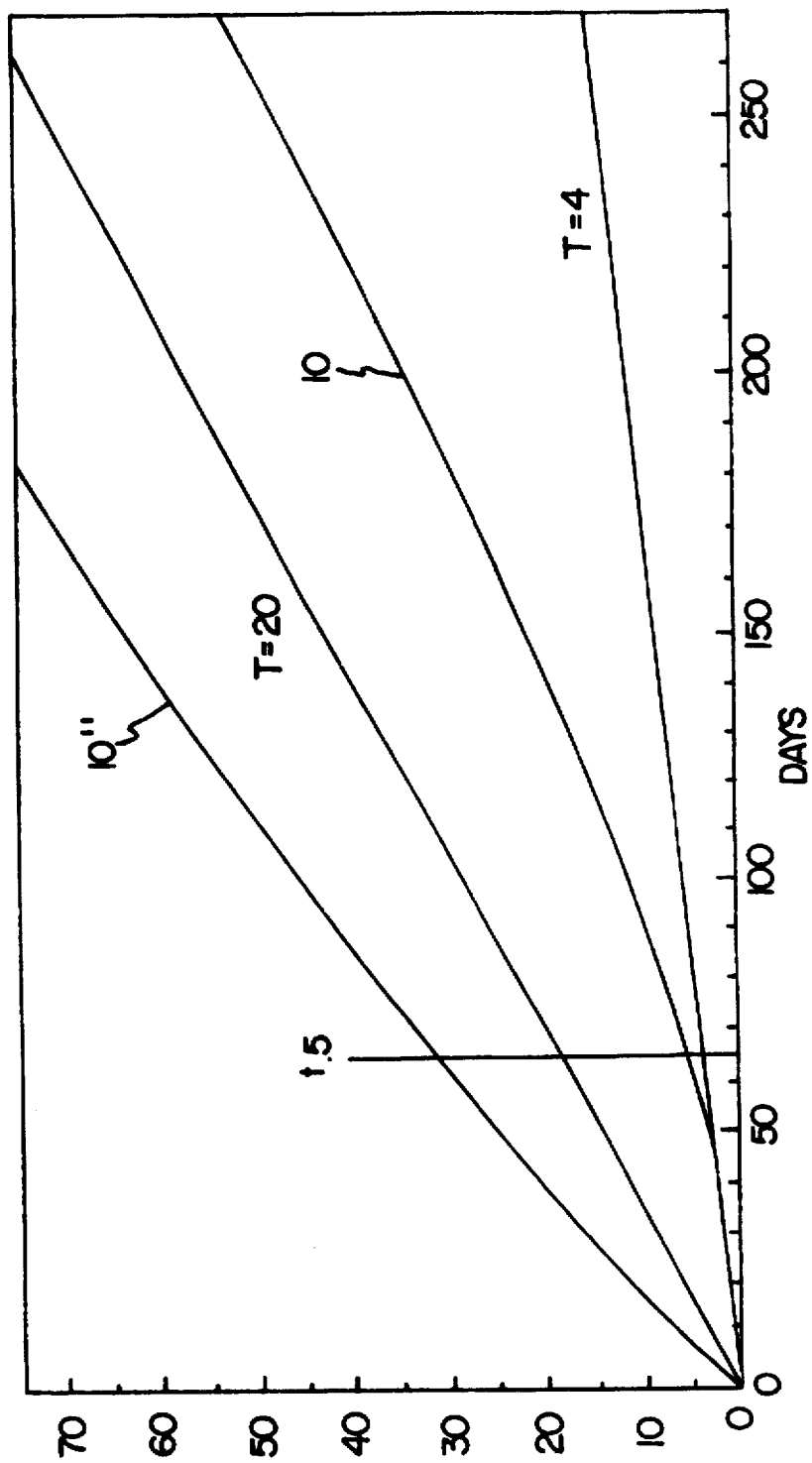
FIG. 7 is a graph depicting the total volume of oxygen transmitted into a package as a function of time for various oxygen barrier constructions.

FIG. 7 depicts the total volume of oxygen which would be transmitted through a variety of different barriers as a function of time for a package having a surface area of approximately 700 cm$^2$. Two of the lines in that figure are directed to prior art packages which utilize a single film barrier, such as that shown in FIG. 2. The line labelled as T=4 designates a single layer film having a transmittance (T) of about 4.0 cm$^3$ O$_2$/m$^2$/atm/day (designated hereinafter as T=4.0); the line in FIG. 7 designated T=20 depicts the total amount of oxygen one would expect to be transmitted through such a single layer film having a transmittance of about 20 cm$^3$ of O$_2$/m$^2$/atm/day (T=20). These two films may be exemplified by a PVDC film of about 13 µm, which has a transmittance of about T=4.0, and a 50 µm nylon 6 film which has a transmittance of about T=20. As can be seen from FIG. 7, both of these lines are substantially linear, indicating the rate of oxygen transmission would be substantially constant over a period of more than 200 days.

Figure 4:
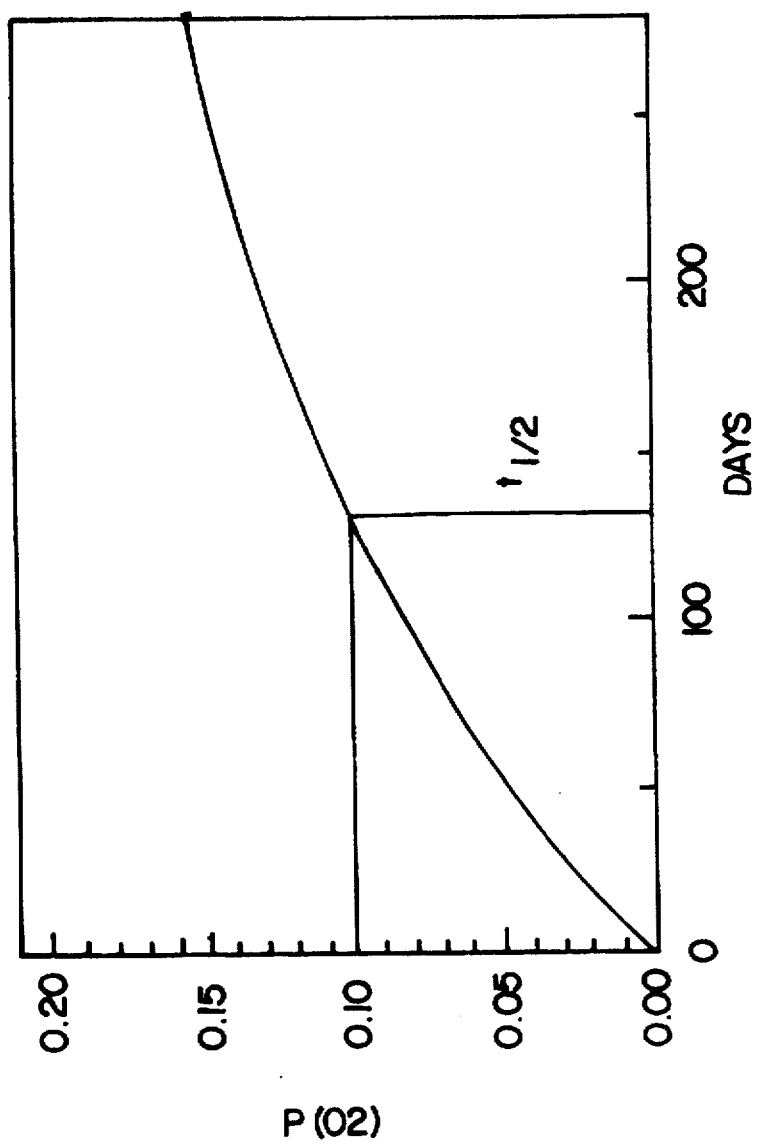
FIG. 4 is a graph depicting the relationship between time and the concentration of oxygen in a closed atmosphere enclosed by a single film layer.

FIG. 4 plots the concentration of oxygen in a package such as that shown in FIG. 2 wherein the product 15 is replaced with dead air. Once again, the surface area of the package is assumed to be about 700 cm$^2$, the external atmosphere is assumed to be air which has a partial pressure of oxygen of about 0.20 atm, and the volume within the package is assumed to be about 530 cm$^3$. At ideal equilibrium, the partial pressure will be substantially the same within the package as it is outside the package, i.e., 0.20 atm (shown as the limit in FIG. 4). The rate of change of the partial pressure of oxygen can be expressed by the following formula 1:

$$(dP/dt)=rate/V$$

wherein P is the partial pressure of oxygen in the container, t is time, and V is the volume within the container, in this case 530 cm$^2$. The rate of oxygen transmission can be expressed as rate=TA(P$_o$−P), wherein T is the transmittance of the barrier, A is the surface area of this barrier, P$_o$ is the partial pressure of oxygen outside of the container (assumed to be that of air at about 0.20 atm) and P is the partial pressure of oxygen in the container. Substituting this expression for the rate in formula 1 and solving the differential equation, the partial pressure of oxygen within the package as a function of time can be expressed as the following formula 2:

$$P(t)=P_o\{1-e^{(-TAt/V)}\}.$$

FIG. 4 plots the partial pressure of oxygen within the prior art container of FIG. 2 as determined in accordance with this formula.

A half-life ($t_{1/2}$) of a container, as used herein, designates the time it takes for the partial pressure of oxygen to reach one-half of its equilibrium level. Obviously, at equilibrium t=∞, the partial pressure within the container (P) will be the same as the partial pressure of oxygen outside of the container (P$_o$). As explained above, in FIG. 4 the partial pressure of oxygen outside of the container is assumed to be about 0.20 atm, which is average for ambient air. Accordingly, the half-life of the film will be the time at which the partial pressure of oxygen within the container reaches about 0.10 atm. As shown in FIG. 4, the t half-life of that film is approximately 130 days for that prior art package, which initially was filled with 530 cm$^3$ of an anaerobic gas.

As noted above, the composite film barrier 10 of the invention includes a substantially anaerobic space 40 between the two plies 20, 30 of the barrier. In a barrier of the invention, the rate of transmission of oxygen into the space 40 can be expressed as the rate of oxygen transmission through the outer ply 30 into the space 40 (rate$_1$)minus the rate of oxygen transmission from the interior space 40 through the inner ply 20 (rate$_2$). By analogy to formula 1, formula 3 can be stated as follows:

$$(dP/dt)=(rate_1-rate_2)/V,$$

wherein V is the volume of the space 40 between the inner ply 20 and outer ply 30 of the barrier 10. As the rate of transmission through each of these barriers can be expressed as TA(P$_o$−P), formula 3 can be expressed as the following formula 4:

$$(dP/dt)=\{T_1A_1(P_o-P)-T_2A_2(P-P_{in})\}/V,$$

wherein P$_{in}$ is the partial pressure of oxygen within the container, i.e. on the side of the inner ply 20 farthest away from the outer ply 30.

It is assumed that the product 15 in the package shown in FIG. 3 will consume any oxygen which is transmitted through the barrier into the interior of the package. Accordingly, P$_{in}$ will always be zero. Integration of the resulting formula yields the following formula 5:

$$P_s=(a/b)P_o\{1-e^{(-bt)}\},$$

wherein a=T$_1$A$_1$/V and b=(T$_1$A$_1$+T$_2$A$_2$)/V. When the barrier 10 is at true equilibrium conditions, i.e. , when t=∞, the partial pressure of oxygen within the space 40 between the plies can be expressed as (a/b)P$_o$.

The optimum balance between respective transmittances of the inner ply and the outer ply, i.e., T$_1$ and T$_2$, respectively, is important in maximizing the overall barrier properties of the composite film barrier 10 of the invention. As noted above, it has been determined that the optimum balance is achieved when these transmittances are about equal to one another. In order to demonstrate this, one can determine when the half-life of the composite film barrier 10 is at its maximum; since this means that the rate of oxygen build-up in the space 40 is at its slowest, the barrier effect of the invention will be at its maximum.

The half-life of the barrier 10 can be expressed as $t_{1/2}$= ln(2)/b. Assuming that the surface areas of the inner and outer plies (20, 30 respectively) are approximately the same, i.e., A$_1$≈A$_2$ and substituting for b, the half-life can be expressed as $t_{1/2}$≈V·ln(2)/A(T$_1$+T$_2$). The resistance of an oxygen barrier is defined as the inverse of its transmittance, i.e., resistance R=1/T. If one were to set a constant total resistance for the barrier (i.e. R$_1$+R$_2$=R, where R is constant), one could define a proportional thickness parameter α such that $R_1=\alpha R$ and $R_2=(1-\alpha)R$. Substituting these values in for $T_1$ and $T_2$, respectively, one obtains the following formula:

$$t_{1/2}=\{VR\alpha(1-\alpha)ln(2)\}/A.$$

Figure 6:
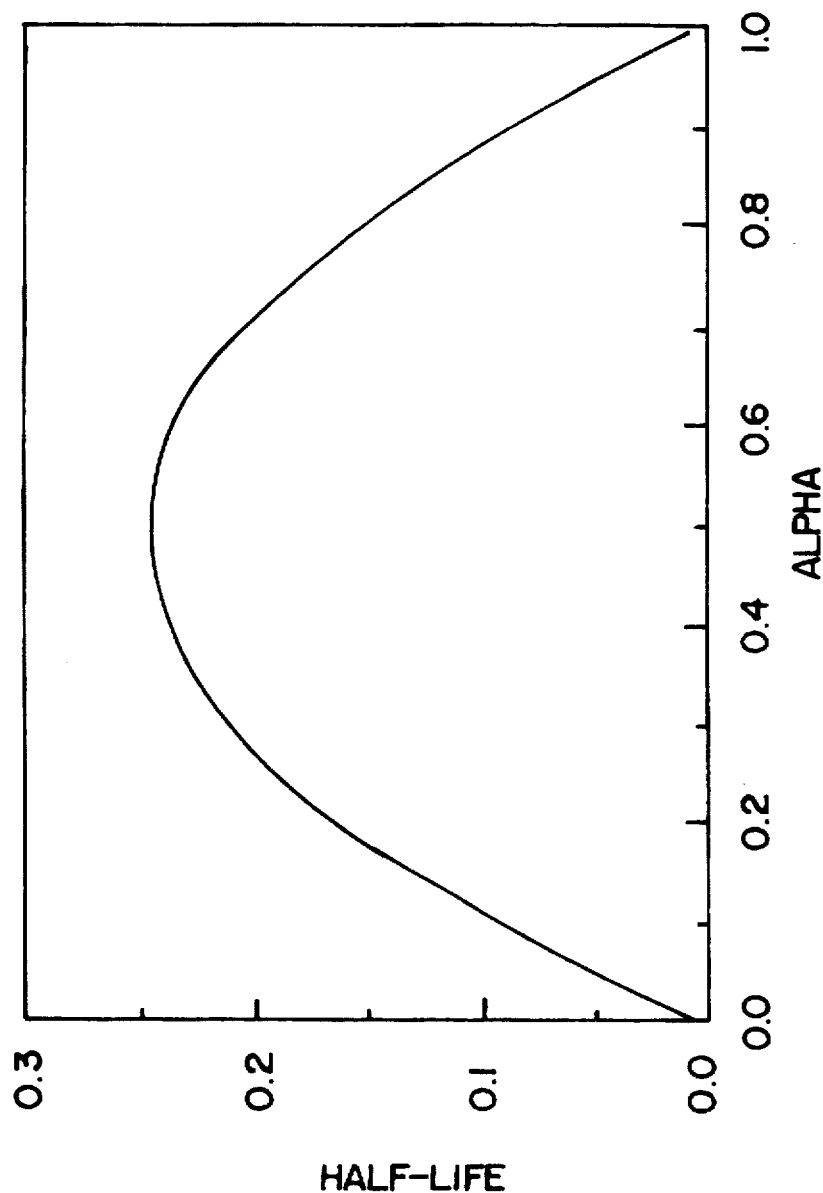
FIG. 6 is a graph illustrating the half-life of a barrier of the invention as a function of a proportional thickness parameter, $\alpha$, of the plies of the composite film barrier of the invention.

Setting all of the other variables as constants and varying only α, one will obtain the generally parabolic curve shown in FIG. 6. As that graph shows, the maximum half-life is obtained when α is between about 0.4 and about 0.6, with the peak being at α=0.5. Thus, when the transmittance of the two plies 20,30 are approximately equal to one another, the half-life (and hence the barrier properties of the barrier 10) is maximized. This may be accomplished in any desired manner, such as by choosing the appropriate thicknesses of two different polymeric materials to obtain approximately equal transmittances for the two films. In many instances, though, it may be easier to make both of the plies of the barrier from the same material at the same thickness, such as by forming both plies from the same stock of sheet material, as explained above.

Figure 5:
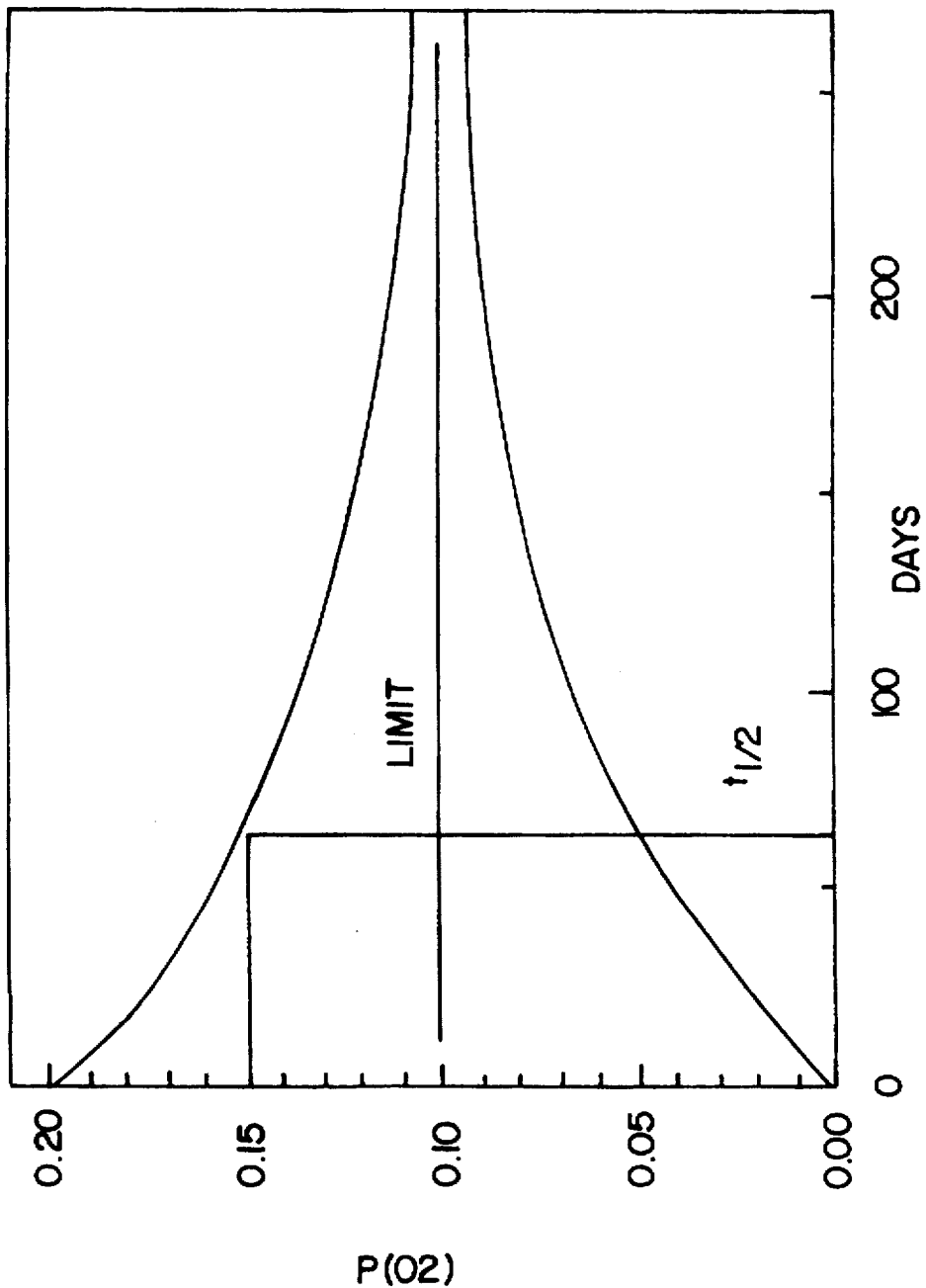
FIG. 5 is a graph depicting the relationship between time and the concentration of oxygen in the "anaerobic" space between the plies of a composite film barrier of the invention and in an "aerobic" space between plies of an analogous composite film barrier.

The bottom curve of FIG. 5 depicts the partial pressure of oxygen within the space 40 as a function of time. As explained above, when the system is at equilibrium, the partial pressure of oxygen within this space is $P=(a/b)P_o$. When the transmissivity of both films is the same, $b=2TA/V$ so formula 5 may be rewritten as the following formula 6 for the particularly preferred embodiment wherein the transmittance of the two films is substantially equal:

$$P_s=\tfrac{1}{2}P_o\{1-e^{(-bt)}\}.$$

From this formula it is clear that the equilibrium partial pressure P is $\tfrac{1}{2}P_o$, or about 0.10 atm when the package is in air with a partial pressure $P_o$ of about 0.20 atm. Accordingly, the limit of the curve is where P=0.10 and the half-life of the barrier is determined at P=0.05, or half of the change before reaching equilibrium.

FIG. 5 also illustrates another important point about the present invention. The top curve in that graph illustrates the partial pressure of oxygen in the space 40 if the space is initially filled with air rather than having an anaerobic gas such as is employed in a barrier 10 of the invention. If the structure of a barrier of the invention is virtually identical to that of the barrier set forth above with the exception that the anaerobic space 40 is replaced with ambient air, the initial partial pressure of oxygen in the space 40 would be about 0.20 atm but would approach the same equilibrium pressure of about 0.10 atm, i.e. the partial pressure of oxygen in the space will decrease over time rather than increase over time as in a barrier of the invention.

Since the other parameters of formula 6 remain the same, the analogous formula for the barrier having aerobic air in the space 40 would be $P_s=\tfrac{1}{2}P_o\{1+e^{(-bt)}\}$; the upper curve in FIG. 5 is based upon this formula. It should also be noted that the half-life of this air-filled barrier would be the same as that for a barrier of the invention; in the case of the model package used to generate the data of FIG. 5 ($T_1=T_2=40$, A=700 cm²=0.07 m², and V=530 cm³) $t_{1/2}$=65.6 days for both of these barriers.

The formula for determining the half lives of these films may be further simplified. If one assumes that the spacing between the two plies 20,30 of the barrier 10 will remain substantially constant across the entire barrier, the volume V of the space 40 will be a function of the areas of the plies.

The same conclusion is reached if, rather than assuming a constant distance between the plies, the distance between the plies varies but the average distance between the plies is known. In particular, the volume V equals the product of the surface area A of the plies (assumed to be about the same for both plies) times the distance between the plies, X. By substitution, the half-life of the film may be expressed as $t_{1/2}=\{Xln(2)\}/2T$ or $t_{1/2}=0.347X/T$. (It is important that the units of the surface area A and the volume V be expressed in the same units. If they are not, such as where the area is expressed in square meters and the volume is expressed in square centimeters, appropriate corrections in units must be made.) Using the same model container used to generate FIG. 5, the half-life is once again 65.6 days and that x is 0.757 cm for that particular design.

In determining the total oxygen transmitted through a barrier 10 of the invention, the relevant rate of transmission is that of the inner ply 20. Although that rate is dependent upon the partial pressure of oxygen in the space 40 between the plies, it is clear that only oxygen which actually passes through the inner ply 20 will actually enter the interior of the package and come into contact with the product 15. Hence, the total oxygen transmitted through a barrier of the invention may be expressed as follows:

$$Total\ O_2 = \int rate_2 dt = A\int TP\ dt$$

Integrating this formula yields the following formula 7:

$$Total\ O_2(t) = \tfrac{1}{2}AT P_o\{t+[1-e^{(-bt)}]/b\}.$$

The curve labelled 10 FIG. 7 shows the total oxygen transmitted through a barrier 10 of the invention. In generating that plot, a container having substantially the same parameters as those of the model container set forth above (i.e. $T_1=T_2=40$, A=700 cm²=0.07 m², and V=530 cm³) was assumed.

As explained above, the transmittance of a polymeric film is generally proportional to the thickness of the film, at least for films of the same material. As noted above, line in FIG. 7 labeled as T=20 roughly corresponds to the oxygen transmitted by a single ply film made of nylon 6 at a thickness of approximately 50 μm. By splitting the thickness of that film in half, such as to about 25 μm of nylon 6, one would expect the transmittance of that single film to be about T=40. Conversely, if one were to place two films having a transmittance of T=40 together to function as a single-ply barrier, one would expect the net transmittance of this laminated film to be about T=20. Since the barrier of the invention used in generating the line 10 in FIG. 7 is composed of two plies each having a transmittance of T=40, one would expect this barrier to transmit oxygen at almost an identical rate to that of the line labeled T=20 in FIG. 7.

FIG. 7 shows that the slope of the curve 10, i.e., the rate at which oxygen is being transmitted through the barrier 10, approaches the same slope as the prior art single-ply film having a T=20. However, it is clear from this figure that the total amount of oxygen transmitted by the barrier 10 of the invention is substantially less than that transmitted by a single-ply film having the same thickness as the total thickness of the two plies 20, 30 of the barrier 10. In particular, the barrier 10 of the invention transmits oxygen at a very low rate in the beginning. As a matter of fact, for about 38 days, the barrier 10 utilizing two plies having a T=40 transmits oxygen at a lower rate than a single-ply film having a T=4. It is only after the partial pressure of oxygen within the space 40 of the barrier increases over time that the transmittance of the barrier will begin to approach that of a single-ply film having the same total thickness as the two plies of the invention.

Food and other products which are sensitive to oxygen generally have a shelf life which is limited by the amount of oxygen which is permitted to come into contact with the food. At least for food products, the shelf life of the product tends to be relatively short. For instance, in the case of refrigerated dough products, the shelf life is limited; for meats and some other products the shelf life may be noticeably less. Accordingly, if one can substantially improve the barrier properties of the package for these products, one can substantially extend the anticipated shelf life of the product. Alternatively, one could use a more transmissive polymer in the plies 20, 30 of the invention than is necessary for a single-ply film such as is currently used, yet achieve the same product shelf life. Although this may not extend the shelf life of the product, this can significantly reduce the cost of the package itself.

As mentioned above, Scholle's U.S. Pat. No. 4,105,818 alleges that the barrier properties of a film may be improved simply by splitting a single film into two plies with each ply having a thickness about half that of the original single ply. However, as explained above, this is, at best, only a part of the truth. If one were to simply laminate the two films on top of one another, such as by wrapping a package in the first ply and then tightly wrapping the second ply over the first ply, one would achieve a transmittance essentially equivalent to that of the single-ply film of the same thickness. Perhaps more importantly, though, Scholle does not even suggest that there is any importance in removing oxygen from any space which may be present between the plies.

The line identified as 10" in FIG. 7 is a plot of the total oxygen transmittance of a barrier having a structure substantially the same as the barrier 10 of the invention but wherein the space 40 is initially filled with air rather than being a substantially anaerobic space. By comparison of the curve 10" and the line labeled T=20 in FIG. 7, it is clear that such a barrier containing air would vastly underperform even a single-ply film having the same total thickness.

The reason for this can be understood a little more fully by reference to FIG. 5. As shown in that graph, the initial partial pressure of oxygen in the space 40 would be the same as that of air, i.e., about 0.20 atm. Hence, the barrier would initially behave as though the inner ply were in direct contact with the ambient environment. The initial transmission rate is therefore that of the inner ply alone, which in this case is about twice that of the single-ply film having a T=20. Over time, the partial pressure of oxygen within the space 40 will approach its equilibrium partial pressure of about 0.10 atm and the barrier will behave as a single-ply film having the same total thickness of the polymer. This is borne out in FIG. 7 by the fact that the slope of the curve 10" gradually approaches that of the line labeled T=20.

Thus, Scholle's teachings are defective in at least three ways. First, there is no indication that there should be any space whatsoever between the two plies of the polymeric film. Second, even if such a teaching were present, there is no indication that this space should be anaerobic. Finally, Scholle's assertions that, at "steady state", the transmittance of two 0.5 mil films is less than half that of a single 1 mil ply simply are not true—the slope of the line 10" approaches that of the T=20 line toward equilibrium. FIG. 7 clearly bears out the fact that at steady state the rate of transmission of the barrier is dependent almost solely upon the total thickness of the polymeric film or films used in forming the barrier.

It is interesting to note that Guilbert mentions the use of an exterior over-packaging to protect an edible film. (See "Technology and Application of Edible Protective Films" at p. 375.) However, there is no recognition by Guilbert that an anaerobic space must be provided between these two films. Accordingly, the packing technique suggested by Guilbert will suffer from the same defects one would observe in a package in accordance with Scholle's limited teachings.

Turning once again to formula 7 and realizing the fact that the variable b can be rewritten in terms of the distance X between the two plies 20, 30 as explained above, it is clear that the total oxygen transmitted by a barrier 10 of the invention is at least in part a function of the distance X. In particular, if one were to significantly increase X, one would expect to significantly increase the half life of the barrier and significantly decrease the transmittance of the barrier and the total oxygen transmitted through the barrier over time. It should be noted that, eventually, the barrier 10 will reach an equilibrium state wherein the total transmittance of the barrier is essentially the same as that of a single-ply film having the same total thickness as the two plies 20, 30, regardless of the distance X. For a greater distance X, though, the half life will be increased and the barrier properties during the early life of the film will be improved significantly.

The actual distance X chosen for a package of the invention such as that shown in FIG. 3 can be varied as desired. In the embodiment noted above wherein a textured ply is used and a vacuum is drawn on the space 40, the distance X will obviously be relatively small. If an anaerobic gas, such as nitrogen, is used to fill the space 40, the distance X between the plies can be increased at will. However, there will be some practical limitations on the distance X in commercial packaging situations.

For instance, the barrier 10 must meet certain other physical requirements in addition to oxygen transmittance, such as tensile and shear strengths, in order to be commercially useful. If one were to greatly increase X, this would permit one to significantly reduce the thickness of the plies 20, 30. However, if the plies are made too thin, they will not be able to withstand even normal abuse during shipping and handling. The distance X would therefore vary dependent upon a number of different factors, including the product being packaged and the anticipated storage conditions of that package. However, as a general rule it is believed that the distance X should be between about 100 and about 10,000 times the average thickness of the two plies. In the preferred embodiment noted above, wherein the thickness of the plies is desirably at least about 10 μm, this will lead to a minimum distance of about 1000 μm (1 mm, or about 4 mils).

Figure 8:
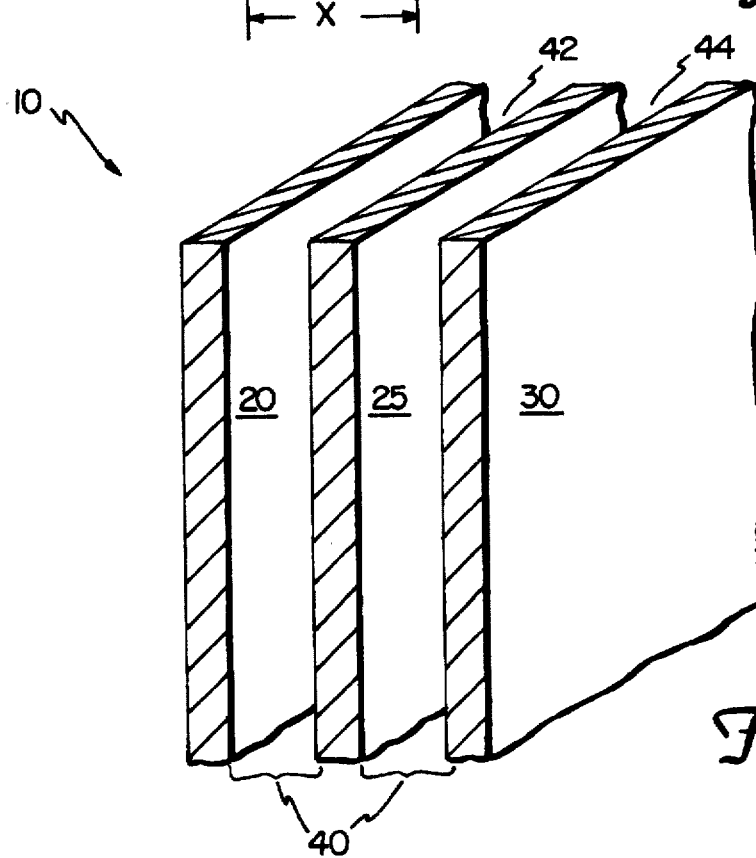
FIG. 8 is a schematic representation of an alternative embodiment of a composite film barrier of the invention utilizing more than two plies.

FIG. 8 schematically illustrates another embodiment of a barrier 10 of the invention. In this embodiment, the barrier includes an inner ply 20 and an outer ply 30, as described above in connection with FIG. 1. However, the embodiment shown in FIG. 8 also utilizes a third, intermediate ply 25 disposed between the inner and outer plies. As illustrated in that drawing, this will divide the space 40 between the inner and outer plies into a first anaerobic space 42 and a second anaerobic space 44.

In many respects, the barrier illustrated in FIG. 8 will perform much like the barrier shown in FIG. 1. However, by adding an additional ply to the barrier one can further increase the half life of the barrier 10 by creating two anaerobic spaces within which the partial pressure of oxygen must be increased. Thus, the barrier shown in FIG. 8 would outperform the barrier shown in FIG. 1, at least until equilibrium is reached. If the total thickness of the various plies used in these two different embodiments is the same, at equilibrium one would expect the total transmittance of both of these barriers to be virtually identical. The embodiment of FIG. 8 simply further delays the equilibrium conditions, thereby reducing the total oxygen transmittance of the barrier.

Figure 9:
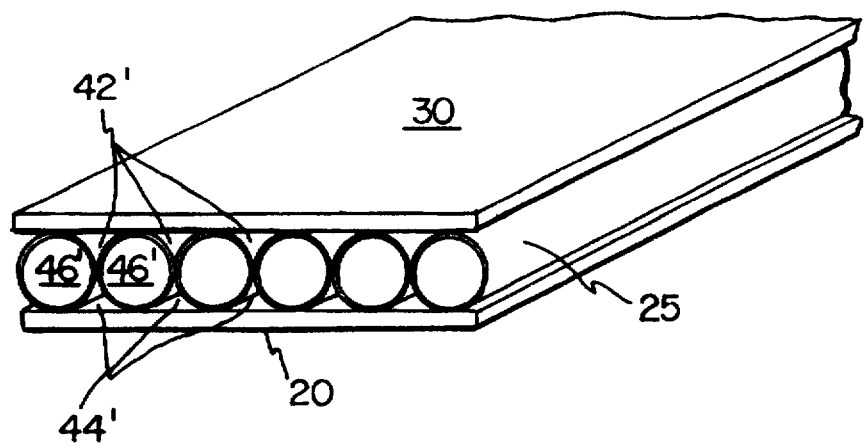
FIG. 9 is a schematic representation of another embodiment of a composite film barrier of the invention employing multiple plies.

FIG. 9 illustrates yet another embodiment of a multiple-ply barrier. This barrier utilizes an inner ply 20 and an outer ply 30 with an anaerobic space therebetween. However, the intermediate ply 25 shown in FIG. 8 is replaced with a plurality of generally tubular members 25'. These tubular members are formed of a polymeric film and are desirably filled with an anaerobic gas. In order for oxygen to be transferred through this barrier, it will first have to pass through the outer ply into the series of divided anaerobic spaces 42' adjacent the outer ply 30. The oxygen will then be transmitted through the polymeric film of the tubular members 25' into the anaerobic space 46' therein. The oxygen must then pass from the anaerobic space 46' into the series of anaerobic spaces 44' adjacent the inner ply 20. Only then will the oxygen be able to proceed into the interior of the package into contact with the product.

This barrier shown in FIG. 9 therefore essentially behaves as a 4-ply barrier in accordance with the invention. It should be understood that any number of plies may be used in the barrier of the invention provided that there is an inner ply 20, an outer ply 30, and at least one anaerobic space 40 disposed between these two plies. If additional plies are used, the anaerobic space 40 may be subdivided into a series of smaller spaces, but the principle of the invention remains the same.

Figure 10:
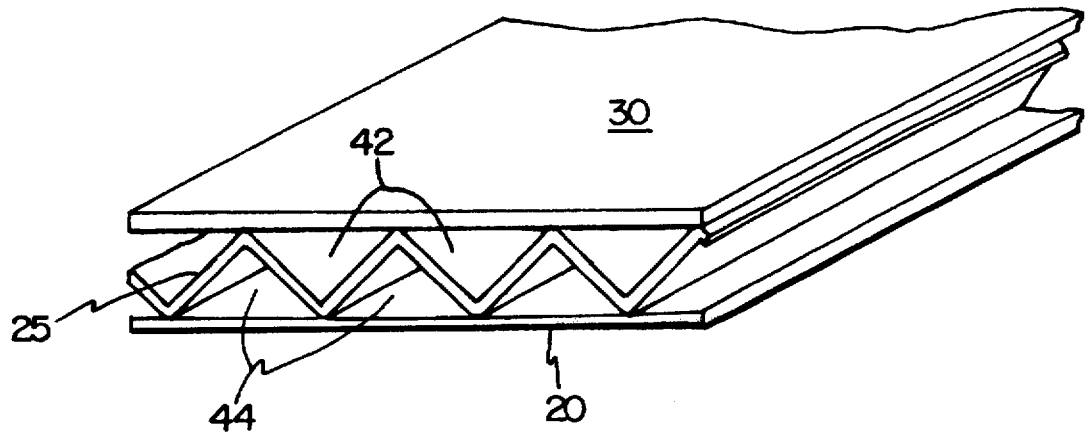
FIG. 10 is a schematic representation of yet another embodiment of a composite film barrier of the invention employing multiple plies.

FIG. 10 illustrates yet another embodiment of a composite film barrier of the invention. As in the previously described embodiments, the present embodiment includes an inner ply 20, an outer ply 30 and an intermediate ply 25 disposed between the inner and outer plies. However, in this embodiment the intermediate ply is corrugated to define a serpentine cross section, as shown in FIG. 10. This intermediate ply abuts the inner and outer plies at the apexes of its corrugations and, in a particularly preferred embodiment, the intermediate ply is physically attached to the inner and outer plies along some or all of these lines of contact. This attachment may be accomplished in any suitable fashion such as adhesion with a cementitious material of by heat sealing the plies to one another.

The construction shown in FIG. 10 provides a three-ply barrier, i.e. a barrier which will function in much the same manner as that shown in FIG. 8. In accordance with the invention, the spaces 42,44 between the plies may be filled with an anaerobic gas, such as nitrogen. In one preferred construction of this barrier, though, the anaerobic gas in the spaces 42,44 is greater than ambient pressure. This will lend structural strength to the barrier, making the barrier useful in forming "semi-rigid" packages. Obviously, the pressure within the spaces 42,44 should not be so great as to cause the plies to rupture during normal shipping and handling. Hence, the pressure should be greater than ambient pressure but not too great; a pressure differential of between about 0.1 and about 0.5 atm should work well.

Figure 11:
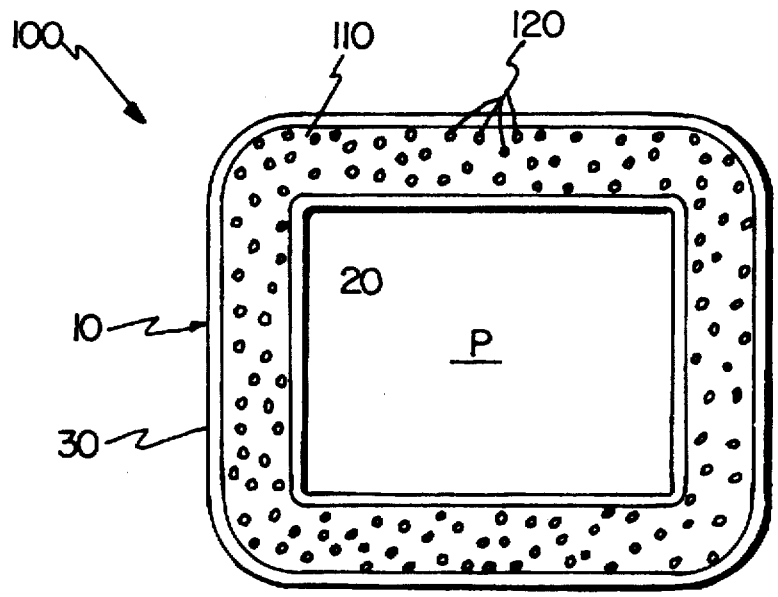
FIG. 11 is a schematic illustration of another embodiment of the invention employing a foamed polymeric material as a barrier.

A somewhat different embodiment of the invention is shown in FIG. 11. Whereas all of the previous embodiments utilize a only polymeric plies to define anaerobic spaces, the invention depicted in FIG. 11 utilizes a foamed polymeric material sandwiched between two plies 20,30 to accomplish a similar end. In particular, the package 100 of this embodiment includes a polymeric material which is foamed to define a polymeric matrix 110 having a plurality of anaerobic spaces 120 dispersed throughout this matrix.

In a preferred embodiment, the foamed polymer is disposed between inner and outer plies (20 and 30, respectively) of a polymeric material such as that set forth above. The anaerobic spaces 120 may be essentially under vacuum or may be filled with an anaerobic gas, not unlike the anaerobic spaces 40 in the previous embodiments. In most instances, it is anticipated that the spaces 120 will be filled with an anaerobic gas rather than utilizing vacuum in order to avoid undue structural stress on the foam structure. Utilizing the foam matrix 110 of this embodiment will serve to further reduce the oxygen transmittance of a barrier 10 of the invention because oxygen must migrate through the matrix 110 before entering the anaerobic spaces 120, further delaying the increase in oxygen concentration in the anaerobic space. This foam may also increase the structural properties of a barrier in accordance with the invention by supporting the two plies in a spaced-apart relationship and, perhaps, adding structural rigidity to the barrier.

The foamed matrix 110 of the embodiment shown in FIG. 11 may be formed of any suitable material that includes substantially anaerobic spaces 120 dispersed relatively uniformly throughout. Care should be taken, though, that the spaces do not become filled with air or any other aerobic gas; if air is present in these spaces 120, the barrier would not perform very well, as suggested by FIG. 7. One possible material for forming the foam matrix 110 is polystyrene. A sheet of foamed polystyrene may be injected between the plies 20,30 by extruding a bulk polystyrene material, such as polystyrene beads, and injecting a low-boiling-point hydrocarbon, such as Freon 12 or pentane, into the molten polystyrene. This type of manufacturing process is commonly utilized in forming foamed polystyrene products such as containers for eggs, hot beverage containers and the like by molding such a polystyrene sheet into the desired shape. If so desired, the matrix 110 may be formed of polystyrene or the like as a sheet material and this sheet material may be laminated with a ply of polymeric material on either side to form a barrier such as that shown in FIG. 11.

As noted above, the present invention also encompasses a variety of package designs incorporating a barrier of the invention. One embodiment of such a package is shown in FIG. 3, wherein a product is completely enclosed in the inner ply 20 and the outer ply 30 fully encloses the inner ply and the product. Two additional embodiments of packages according to the present invention are illustrated in FIGS. 12 and 13.

Figure 12:
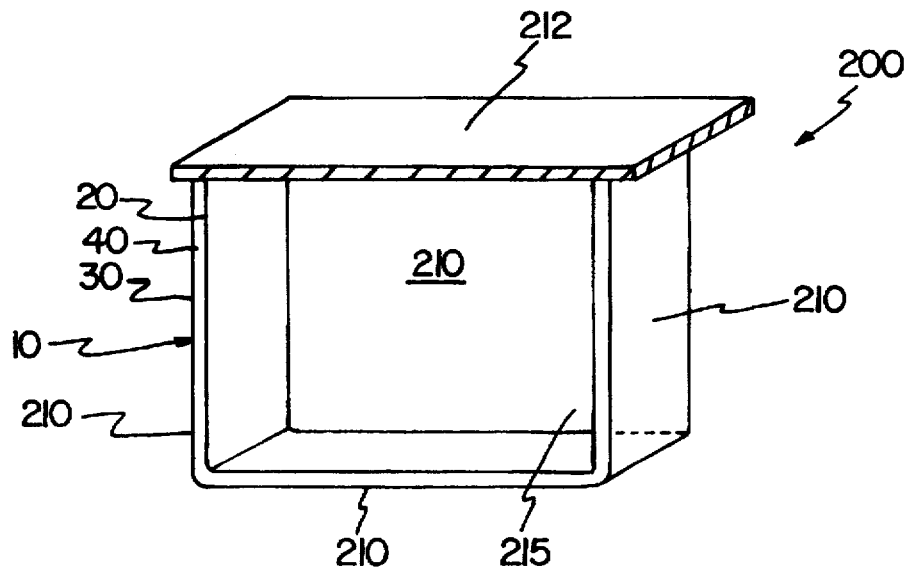
FIG. 12 is a schematic illustration of a package in accordance with the present invention.
Figure 13:
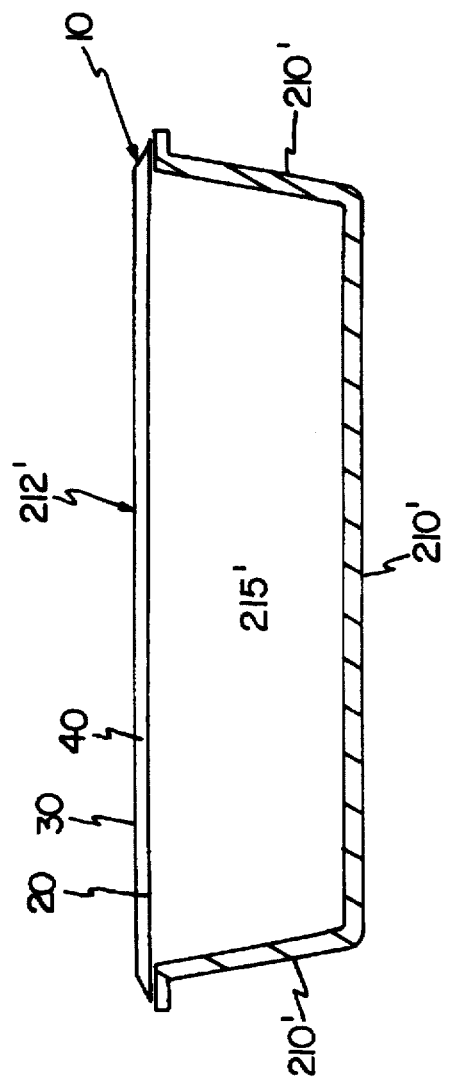
FIG. 13 is a schematic illustration of another embodiment of a package according to the invention.

In the embodiment of FIG. 12, the package 200 comprises a plurality of sidewalls 210 defining an inner cavity 215 for receiving a product P. Most of the sidewalls are formed of a barrier 10 of the invention. As explained above, this barrier is desirably formed from a transparent, or at least translucent, material to permit a consumer to view the contents of the package.

At least a portion of one sidewall 212 of the package, though, is desirably formed of another material, which may be opaque. Forming this side of an opaque material permits a label or the like to be imprinted directly on the package. The material used in this sidewall 212 should have an oxygen transmittance no greater than that of the barrier 10 of the invention, and preferably has a transmittance lower than that of the barrier 10. This sidewall 212 may, for instance, be formed of a laminated material that incorporates a metal layer, such as an aluminum film, which would make the sidewall 212 essentially oxygen impervious. This structure utilizes material quite efficiently in producing a package which permits a consumer to see the product at the point of purchase.

As explained previously, it is important that the barrier 10 of the invention be essentially sealed from direct contact with the ambient environment. Accordingly, when the sidewalls 210 of the package shown in FIG. 12 is formed, the plies of the barrier should be sealed together to seal off the anaerobic space therebetween. This may be accomplished by sealing the plies of the barrier together while leaving excess material extending beyond the seat, with the other sidewall 212 being attached to this excess material after the product P is placed in the inner cavity 215 of the container. Alternatively, the sealing of the plies may take place when the sidewall 212 is attached to the remaining sidewalls, such as where the sidewall 212 is attached to the rest of the package by heat sealing or the like.

Another embodiment of a package 200' according to the invention is shown in FIG. 13. In this embodiment, a barrier 10 of the invention comprises only a single sidewall 212' of the package while the remaining sidewalls 210' are formed of another material. Once again, it is preferred that the material comprising the other sidewalls 210' have an oxygen transmittance no less than that of the barrier. This embodiment has particular utility providing a window or a visible side in a package which is otherwise opaque or translucent.

For instance, many food products, such as frozen foods, are sold in trays which are sized to hold a single serving of a product. The trays must generally be formed of an opaque material that has sufficient structural strength to contain the product and function as a plate or bowl for the consumer. In accordance with the invention, a tray such as that commonly used in packaging frozen foods may be provided with a substantially transparent composite film barrier of the invention as a cover on the tray. The barrier 10 should be sealingly attached to the tray about the periphery of the upstanding sidewalls 210' in such a manner as to effectively seal the plies of the barrier to one another and seal the barrier to the sidewalls; heat sealing should work well for many polymeric materials.

Alternatively, it may be desirable to provide a package that has a very low oxygen transmittance and utilize a barrier of the invention as a relatively small window in only a portion of a single sidewall. Although this embodiment is not specifically illustrated in the drawings, it is very similar to the embodiment of FIG. 13 except that only a portion of the sidewall 212' would be formed of a barrier 10, with the balance of that sidewall being formed of a material having a transmittance of no less than that of the barrier. Such a package may be used, for instance, when there is a need to protect the product from the effects of excessive ultraviolet light, yet it is desirable to allow consumers to see the product at the point of sale.

While a preferred embodiment of the present invention has been described, it should be understood that various changes, adaptations and modifications may be made therein without departing from the spirit of the invention and the scope of the appended claims.

What is claimed is:

1. A composite film barrier for packaging an oxygen sensitive product comprising an inner ply of an oxygen permeable polymeric material disposed adjacent the product, an outer ply of an oxygen permeable polymeric material spaced away from the inner ply, and a substantially anaerobic space defined by the inner and outer plies to form the barrier, each of the inner and outer plies having an oxygen resistance, wherein the ratio of the oxygen transmittance rate of the inner ply to the sum of the oxygen transmittance rate of the outer ply and the oxygen transmittance rate of the inner ply is between about 0.4 and about 0.6, wherein the total amount of oxygen transmitted by the barrier over a period of time is less than the amount of oxygen transmitted over the same period of time by a single ply film having an oxygen transmittance rate which is approximately equal to the total oxygen transmittance of the inner and outer plies.

2. The composite film barrier of claim 1, wherein the inner ply is formed of an edible material.

3. The composite film barrier of claim 1, wherein the outer ply is formed of an edible material.

4. The composite film barrier of claim 2, wherein the outer ply is formed of an inedible material.

5. The composite film barrier of claim 1, wherein the anaerobic space consists of an anaerobic gas.

* * * * *